US009632884B2

(12) United States Patent
Bittles et al.

(10) Patent No.: US 9,632,884 B2
(45) Date of Patent: Apr. 25, 2017

(54) MAINTAINING COMPUTER SYSTEM OPERABILITY (71) Applicant: International Business Machines Corporation, Armonk, NY (US)

(72) Inventors: William Bittles, Winchester (GB); Andrew D. Martin, Hampshire (GB); Timothy F. McCarthy, Eastleigh (GB)

(73) Assignee: GLOBALFOUNDRIES INC., Grand Cayman (KY)

(*) Notice: Subject to any disclaimer, the term of this patent is extended or adjusted under 35 U.S.C. 154(b) by 168 days.

(21) Appl. No.: 14/291,305

(22) Filed: May 30, 2014

(65) Prior Publication Data
US 2015/0006949 A1    Jan. 1, 2015

(30) Foreign Application Priority Data

Jun. 28, 2013  (GB) .................................. 1311604.1

(51) Int. Cl.
*G06F 11/00* (2006.01)
*G06F 11/20* (2006.01)
*G06F 9/445* (2006.01)

(52) U.S. Cl.
CPC ............ *G06F 11/2007* (2013.01); *G06F 8/65* (2013.01); *G06F 11/2023* (2013.01); *G06F 11/2028* (2013.01); *G06F 11/2094* (2013.01)

(58) Field of Classification Search
CPC ............ G06F 11/2094; G06F 11/2023; G06F 11/2028; G06F 11/20; G06F 11/2015; G06F 11/2025; G06F 11/14; G06F 11/1666; G06F 11/2005; G06F 11/2038
See application file for complete search history.

(56) References Cited

U.S. PATENT DOCUMENTS

| 6,578,158 | B1 | 6/2003 | Deitz et al. |
| 6,625,747 | B1 | 9/2003 | Tawil et al. |
| 6,779,064 | B2 | 8/2004 | McGowen et al. |
| 6,823,477 | B1 | 11/2004 | Cheng et al. |
| 7,111,084 | B2 | 9/2006 | Tan et al. |
| 7,237,154 | B1* | 6/2007 | Zorian ............ G11C 29/56008 714/711 |
| 7,313,681 | B2 | 12/2007 | Chen et al. |

(Continued)

OTHER PUBLICATIONS

Lascu et al., "An Introduction to the New IBM @server pSeries High Performance Switch", Copyright International Business Machines Corporation 2003, First Edition (Dec. 2003), pp. 1-274.

*Primary Examiner* — Charles Ehne
(74) *Attorney, Agent, or Firm* — Anthony Canale; Andrew M. Calderon; Roberts Mlotkowski Safran Cole & Calderon P.C.

(57) ABSTRACT

Maintaining operability of a network-connected data processing apparatus is provided. In response to a requirement for failover from a first resource to a second resource, one or more processors tests an availability of the second resource, wherein the first and second resources are redundant resources of a network-connected data processing apparatus that is communicatively coupled to at least one host computer. In response to a positive determination of the availability of the second resource, one or more processors initiates the failover; and in response to a negative determination of the availability of the second resource, one or more processors provides an indication of unavailability.

17 Claims, 7 Drawing Sheets (56) References Cited

U.S. PATENT DOCUMENTS

| | | |
|---|---|---|
| 7,760,626 B2 | 7/2010 | Malpani et al. |
| 8,074,099 B2 | 12/2011 | Arata et al. |
| 2002/0188711 A1 | 12/2002 | Meyer et al. |
| 2003/0126315 A1* | 7/2003 | Tan ................... G06F 11/201 710/1 |
| 2004/0246894 A1* | 12/2004 | McDermott ........ H04L 41/0893 370/229 |
| 2005/0102562 A1 | 5/2005 | Shinohara et al. |
| 2007/0174655 A1* | 7/2007 | Brown ..................... G06F 9/54 714/2 |
| 2007/0283314 A1* | 12/2007 | Browning ........... G06F 11/1433 717/100 |
| 2008/0184217 A1 | 7/2008 | Kai |
| 2009/0276665 A1* | 11/2009 | Mayer ................. G06F 11/3648 714/38.13 |
| 2009/0307522 A1* | 12/2009 | Olson ................. G06F 11/2007 714/4.1 |
| 2009/0319702 A1 | 12/2009 | Matumura et al. |
| 2010/0052625 A1* | 3/2010 | Cagno ................... G01R 31/028 320/166 |
| 2010/0162223 A1 | 6/2010 | Hattori et al. |
| 2012/0124414 A1 | 5/2012 | Dallas et al. |
| 2012/0144110 A1* | 6/2012 | Smith ................... G06F 3/0607 711/114 |
| 2013/0097304 A1* | 4/2013 | Asthana .............. H04L 41/5025 709/224 |

\* cited by examiner

MAINTAINING COMPUTER SYSTEM OPERABILITY

FIELD

The present disclosure relates to the field of maintaining computer system operability. In particular, the present disclosure relates to maintaining operability of computer systems during a system update and non-disruptive updating of software and firmware for components of an active computer system.

BACKGROUND

Many modern businesses rely on high availability of their computer systems and networks and rely on in-built storage redundancy and communication path redundancy to maintain operability when failures occur. It is common for service engineers to have to perform service operations on currently active systems, without disrupting active application programs. When there is a requirement for concurrent code updates to a pair of components of an active heterogeneous computer network, which pair of components would normally provide redundancy and enable failover, there is an increased risk of disruptions to system operations. In particular, in a computer system including one or more host computer systems and a redundant storage system that uses a failover mechanism to maintain operations, there is a risk that service operations carried out on separate parts of an active storage system could lead to system outages if reliance is placed on conventional failover operations being performed automatically and sequentially. That is, if unavailability of a first system resource leads to a first failover operation, a subsequent failover may not succeed in response to unavailability of a second resource, if a host computer retains information about the first resource's previous unavailability.

SUMMARY

Embodiments of the present disclosure provide a method, system, and program product to maintain computer system operability.

One embodiment of the present disclosure provides a method for maintaining operability of a network-connected data processing apparatus that is communicatively coupled to at least one host computer to handle operations for the host computer, wherein the data processing apparatus has first and second resources to provide redundancy, and the host computer has a failover capability for responding to loss of availability of a first resource of the data processing apparatus by performing failover to a second resource. The method includes: in response to a requirement for failover from a first resource to a second resource, testing the availability of the second resource; in response to a positive determination of the availability of the second resource, initiating the failover; and, in response to a negative determination of the availability of the second resource, providing an indication of unavailability.

Another embodiment of the present disclosure provides a data processing system for maintaining operability between network-connected components of the system. A data processing apparatus is communicatively coupled to at least one host computer to handle operations for the host computer, wherein the data processing apparatus has first and second resources to provide redundancy. At least one host computer has a failover capability for responding to loss of availability of a first resource of the data processing apparatus by performing failover to a second resource. A controller for maintaining operability of the system: responsive to a requirement for failover from a first resource to a second resource, tests the availability of the second resource; responsive to a positive determination of the availability of the second resource initiates the failover; and responsive to a negative determination of the availability of the second resource provides an indication of unavailability.

For the avoidance of doubt, the terms "including" and "comprising" as used throughout this specification are not to be construed as meaning "consisting only of" but are to be construed as a non-exclusive terms.

DETAILED DESCRIPTION

Figure 1:
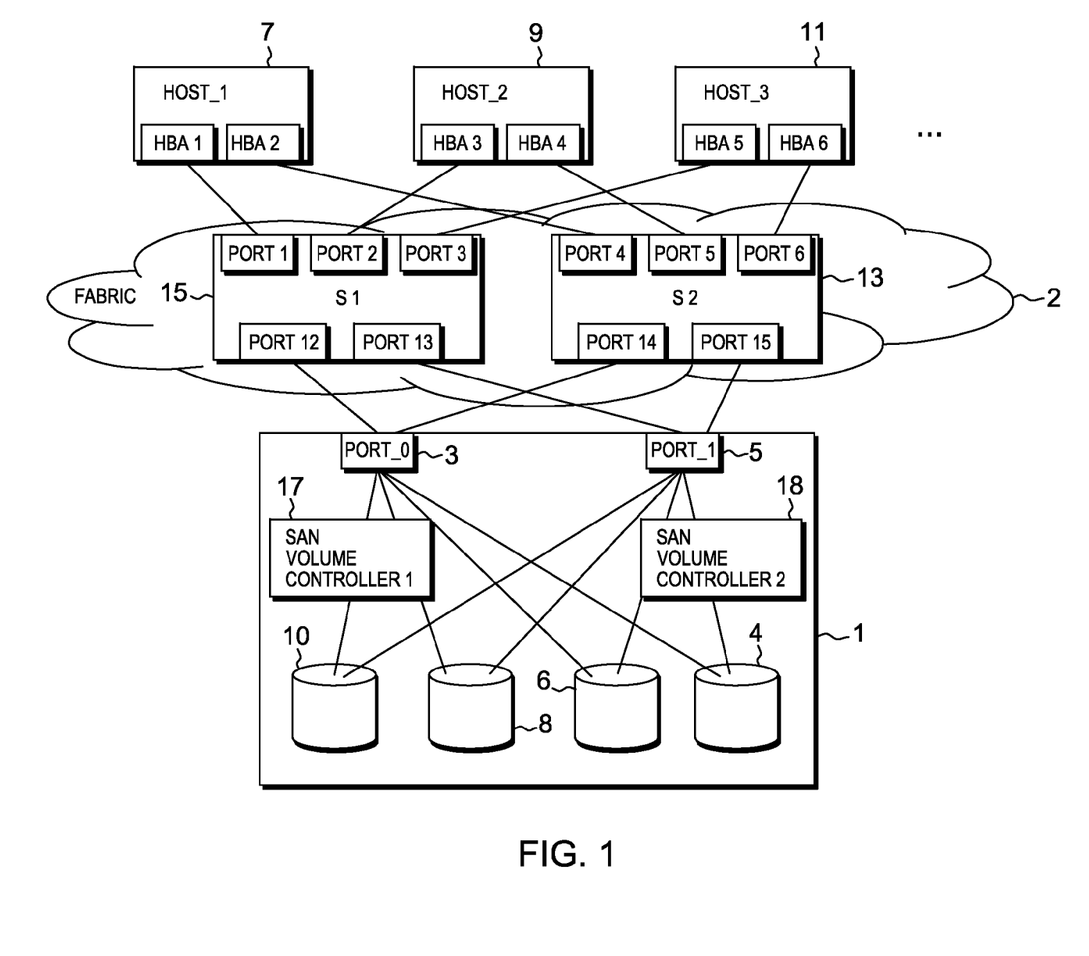
FIG. 1 is a functional block diagram illustrating an environment, in accordance with an embodiment of the present disclosure.

A common computer system configuration involves storage devices arranged in a storage area network (SAN) and coupled to one or more host computers. The storage devices typically store data originating from the hosts, and are used by the hosts to retrieve data. A host can be, for example, a personal computer (PC) or an industrial server having the ability to send commands to the storage device via the SAN. The storage devices of the SAN and their operations are usually controlled by a storage controller such as the IBM® Storage Systems SAN Volume Controller (SVC) from IBM Corporation, which is coupled to the storage devices. (IBM is a trademark of International Business Machines Corporation, registered in many jurisdictions worldwide.) FIG. 1 illustrates such a conventional computer system architecture including a collection of hosts 7,9,11, a set of storage devices 4,6,8,10 in a storage area network (SAN) 1, a pair of storage controllers 17,18, and switches 13,15. It is understood that a storage system may comprise a group of storage devices 4,6,8,10 with data stored in logical units (LUNs) distributed across the devices. A SAN "fabric" is an area of the network containing hardware such as switches and routers that connect the hosts 7,9,11 to the storage system 1 and that route packets travelling between them. The well-known Redundant Array of Independent Disks (RAID) is an example arrangement of storage devices that can be controlled by a storage controller (such as IBM Corporation's SAN Volume Controller) or a pair of controllers providing redundancy. FIG. 1 illustrates communication links between the hosts shown 7,9,11 and the storage devices 4,6,8,10. These links are enabled by network interfaces or Host Bus Adapters (HBAs). Typically, each host includes a pair of HBAs and each host is attached to the SAN through the pair of HBAs. An HBA could be, for example, a Small Computer System Interface (SCSI) adapter or a Fibre Channel adapter or other kind of adapter. It is noted that the HBA may be implemented as a plug-in-card on the host computer system. The HBA is communicatively linked to the fabric and the Operating System (OS) of the host and acts as a communication interface between the OS and the fabric. Each of hosts 7,9,11 may include internal and external hardware components, as depicted and described in further detail with respect to FIG. 7.

Figure 2A:
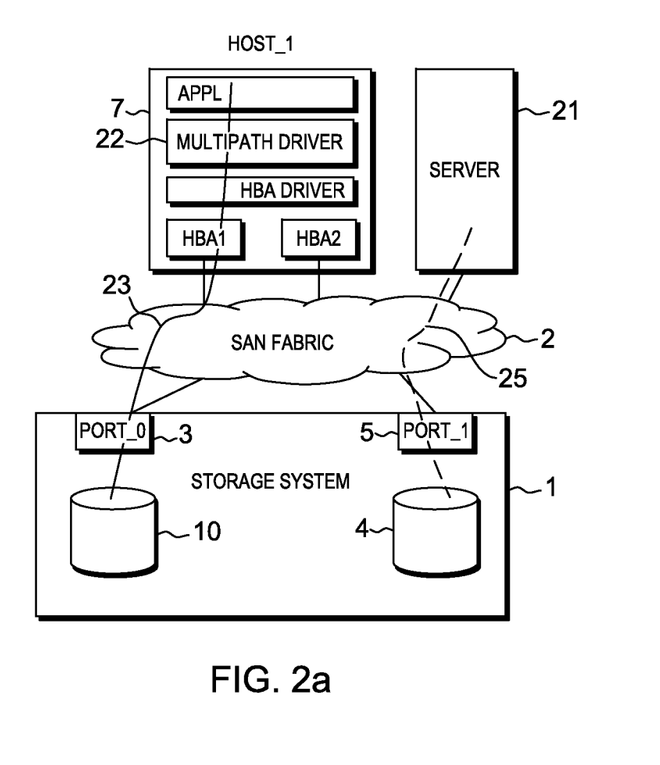
FIG. 2A is a functional block diagram illustrating a flow of data along a primary path between a host and a storage system, in accordance with an embodiment of the present disclosure.
Figure 2B:
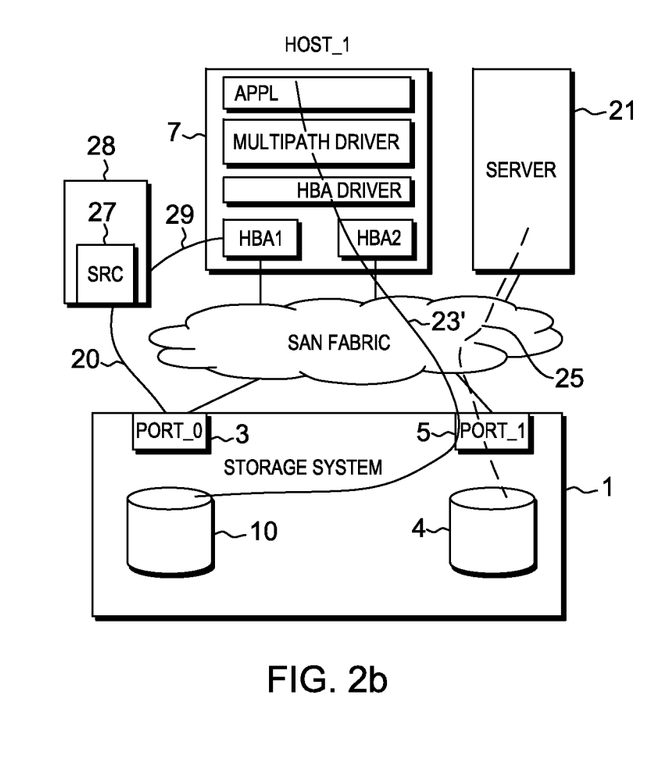
FIG. 2B is a functional block diagram illustrating a flow of data along an alternative path and a software source connected to a part of the storage system, in accordance with an embodiment of the present disclosure.

Typically, an HBA includes a monitoring capability (e.g. within firmware) that monitors the communication fabric for indication that a failover condition may be present. A condition that could trigger a failover mechanism includes: network transmission errors, system overloading, denial of Service attacks (which cause mechanical and/or thermal stress), hardware component failure etc. A failure could occur anywhere on the SAN (e.g., failing SCSI or fibre-channel cable) or locally on a Host (e.g., an HBA failure). In order to provide path-failover protection, a multipath driver typically performs detection of a path failure, notification to the host system of the path failure, and selection and use of an alternative data path. Failover mechanisms provide enhanced data availability and service continuity when a component associated with the SAN fails or stops. When it is detected that an active path experiences a failure, the failover mechanism dynamically switches or reroutes the Input/Output (I/O) operations to another operational path. The path failure is normally transparent to the host. Throughout this description, an alternative operational path is also called a secondary path, but in some implementations there can be more than two alternative paths. FIGS. 2a and 2b display a traffic flow along two paths 23, 23' between the host 7 and the storage system before and after the failover has switched the data path. Hosts are usually configured with a pair of HBAs for the purpose of providing redundancy and fault tolerance. In this example, the failover on the host 7 labelled 'Host_1' caused the data path travelling through host bus adapter 'HBA1' and 'port_0' to be rerouted along the secondary path (the failover path) via HBA2 and port_1. Failover mechanisms provide redundancy by eliminating a single point of failure. This capability to reroute data and I/O operations through a failover path prevents a single failure from disrupting the host's accessing of a storage device.

When the storage area network 1 supports active-active disk access, it can provide continuity and potentially load balancing of the traffic using a plurality of paths when one link associated with a host (e.g., HBA1) fails. In order to provide failover protection, the storage system is configured such that there is a minimum of two independent paths that share the same Logical Unit. For example, in FIGS. 2a and 2b, the device 10 is accessible via 'port_0' and 'port_1'.

Embodiments of the present disclosure recognize redundancy and failover mechanisms in which failover is normally used as an immediate response to an unexpected failure or abnormal termination. Embodiments of the present disclosure provide for using a failover capability and alternative communication paths to support non-disruptive concurrent code uploads, where the circumstances that necessitate the failover are planned. That is, when carrying out a system upgrade or other servicing that involves taking one or more system components temporarily out of service, an automatic failover mechanism can be used to maintain operations on behalf of the hosts while the service operations are carried out. However, embodiments of the present disclosure further recognize that standard failover mechanisms cannot be relied upon to successfully handle concurrent code updates in a heterogeneous computer network. An additional level of control is needed to ensure that service operations such as concurrent software updates are non-disruptive. This is explained below. The upgrade process is non-disruptive if the set of service operations are completed without disrupting any application.

Updating a software or firmware current release or upgrading to a new release includes installing the software/firmware and applying the update or replacing the previous code. During a Concurrent Code Upload (CCU), a set of codes is typically uploaded from a source 27 to the target system. The source can be on a hard disk drive or random access memory of a computer system connected to the SAN, or on a CD, a DVD or other recording medium. Alternatively, the source can be on a FTP server, a web server, a network drive, or other type of storage medium accessible via network connections when the upgrade is required. The source 27 can be accessed via a network connection such as an Internet connection, a modem connection or a PPP link, or through a direct link such as USB or through other types of links. In modern storage systems such as Symmetric Active-Active systems, a portion of the system that is being upgraded is temporarily made unavailable, and all I/O operations that would have been serviced by components of that portion of the system must be serviced by components within another portion of the system. Ideally, this redirection of I/O operations happens automatically using the system's failover mechanism.

Computer systems that include failover capability still suffer from interruptions if they ever fail to fail over. For example, an HBA client may fail to failover when it is expected to. When software or firmware is being upgraded, the portion of the system being upgraded is temporarily unavailable for use in failover as well unavailable in other operations. The same reduced ability to failover can occur for a period when replacing a hardware component. Therefore, whenever part of the Active-Active configuration is taken out of active service, a failure of another component such as an HBA can cause host outage.

As summarized briefly above, embodiments of the present disclosure recognize a potential problem when servicing active systems. This is partly because of the heterogeneous nature of typical computing networks—integration between the various components is less than perfect and so component status information is not always updated automatically. If a first part of an active data storage system configuration involving paired storage controllers is taken out of service for a software or firmware update, the system can be expected to failover and operations will continue via an alternative communication port and using a second one of the pair of storage controllers. Therefore, a systems engineer could take one communication port out of service and rely on the system's failover capability to maintain successful operations without host outages, unless an unexpected failure occurs (e.g., failure of an HBA or in the storage system itself). The engineer can then upload the new software or firmware and then return the upgraded first part of the system to active service. The systems engineer can then repeat the operation on a second port of the storage system to upgrade software or hardware associated with this second port, but problems can arise. In particular, if any of the hosts retain information about the unavailability of the first part of the system, they may reject an instruction to failover from the second port to the first port (i.e., even though the first port is now available for use, its availability may not have been registered correctly by the hosts). Therefore, system engineers' actions performing concurrent code updates to an active system involve a risk of causing system outages if too much reliance is placed on conventional failover mechanisms to perform a sequence of failovers.

Embodiments of the present disclosure recognize that reliance on conventional automated failover has an increased risk of failure when a sequence of failovers is required for a set of updates involving a set of system components, a wholly manual switchover approach would have its own risks in a complex distributed data processing system—including the risk of human errors and a likelihood of unnecessary delays before completion of the set of updates.

Embodiments of the present disclosure recognize that automatic failover can be used, and yet the risk of host outages can be reduced, by means of an additional control mechanism implementing a verification method. The present disclosure provides a method and a system to mitigate the abovementioned problems.

According to embodiments of the disclosure, one or more actions of a service operation such as involving a sequence of software uploads is made conditional on verification of the system's ability to successfully failover to an active part of the system. In a storage network configuration in which one of more storage systems handles operations on behalf of one or more host computers, an attempt is made to verify readiness for failover of each host's I/O operations, and in the event that there is no successful verification that host I/O operations can be successfully switched to the part of the configuration that will remain active, then the service operation is prevented from taking place until it is possible to verify that normal I/O operations will not be disrupted.

In some embodiments, this can involve instructing each host to send I/O signals along a failover communication path to test its successful operation, and requiring validation of successful use of the failover path before taking components of an alternative path out of service. This two-stage operation (test the ability to failover before initiating an action that will make failover necessary) can avoid disruption to critical systems.

The above-described proactive verification, before taking a potentially disruptive action, differs from reactive failover operations that involve immediate automated responses to failures and abnormal terminations for the sake of maintaining system operability. Embodiments of the present disclosure provide such verification in the context of planned service operations for active computer systems that include failover mechanisms, where an attempted failover is a predictable outcome of taking a component temporarily out of service, and where continued system operation is required.

Embodiments can be used in the context of service operations involving concurrent code uploads to a plurality of components of a system within a heterogeneous computer network that must remain active throughout the service operation, and especially for concurrent code updates on symmetric active-active storage systems that require a sequence of failovers to be performed successfully. Where the system has in-built redundancy including a failover mechanism for switching to a failover path when a primary path is unavailable, it may be thought that systems engineers can rely on the existing failover capability, but embodiments of the present recognize a potential problem and provide an additional preparatory action for second and subsequent failover operations. The approach provided involves controlled automatic initiation of the switching to a failover path to mitigate the risks of unsuccessful failover and provide greater assurance of continued system operability.

A method according to an embodiment prevents initiating a software upload or other upgrading of components of a storage system until there is confidence that the storage system will be able to successfully failover if the components are taken out of active service. This helps to ensure that the storage system will maintain successful handling of host requests. Without this method, host outages might arise when the system fails to failover when a component is taken out of service for a software update or other service operation. This is because, if the host fails to failover from the path leading to the part of the storage system containing the component being upgraded, the host will not be able to access the part of the system being upgraded nor will it be able to access other parts of the storage system via an alternative failover path.

In one embodiment, action is taken to verify that all hosts' failover paths are operational before taking other parts of the system out of active service to reduce the risks associated with a temporary reduction in system redundancy and failover capability.

One embodiment provides a data processing system for maintaining operability between network-connected components of the system, comprising: a data processing apparatus that is communicatively coupled to at least one host computer to handle operations for the host computer, wherein the data processing apparatus has first and second resources to provide redundancy; at least one host computer, the host computer having a failover capability for responding to loss of availability of a first resource of the data processing apparatus by performing failover to a second resource; and a controller for maintaining operability of the system, wherein the controller is: responsive to a requirement for failover from a first resource to a second resource, to test the availability of the second resource; responsive to a positive determination of the availability of the second resource to initiate the failover; and responsive to a negative determination of the availability of the second resource to provide an indication of unavailability.

One embodiment provides a method for maintaining operability of a network-connected data processing system that is communicatively coupled to at least one host computer to handle operations for the host computer, wherein the data processing system has first and second resources to provide redundancy, and wherein the host has a failover capability for responding to loss of availability of a first resource by performing failover to the second resource, wherein the method includes: in response to a requirement for failover from a first resource to a second resource, testing the availability of the second resource; in response to a positive determination of the availability of the second resource, initiating failover to the second resource; and in response to a negative determination of the availability of the second resource, providing an indication of unavailability and deferring failover.

The first and second resources may be a pair of storage system controllers, a pair of storage systems, a pair of communication ports of a single system, or a pair of communication pathways including communication ports and associated system components.

The testing of availability of the second resource may involve a systems update controller contacting all connected hosts, the hosts sending I/O operation signals via a failover communication path of the system, and the hosts monitoring whether this failover communication path is operational. This is described in more detail below.

In one embodiment, in which the method is performed within a system requiring concurrent service operations for a plurality of system resources including first and second resources that provide redundancy, the verification is carried out only when a failover is requested that will reverse a previous failover. Embodiments of the present disclosure contemplate the second one of a pair of failover operations between first and second resources as being more likely to fail than the first failover, because host computers will already have been made aware of unavailability of one or more system resources when the first failover was initiated. This awareness may prevent a desired failover to those resources.

In one embodiment, a task list is generated to identify a required set of service operations and the relevant system resources, and the method includes: in response to a request for failover from a first resource to a second resource, the task list is checked for any previous service operations on the second resource; in response to a positive determination that a previous service operation was performed on the second resource, a test is carried out to determine the availability of the second resource for handling operations on behalf of the host computer before initiating a failover; and in response to a negative determination, allowing a failover to be initiated without testing availability of the second resource.

In one embodiment, a method is provided for controlling non-disruptive uploading of software or firmware onto a data storage system, the storage system (1) having first and second activable ports (3,5) and being communicatively coupled to at least one host computer (7,9,11) via the first port (3) and/or the second port (5), wherein the method includes: when the software is to be uploaded on the storage system (1), selecting one of the first and second port (3,5) as a target port; requesting that each of the at least one host (7,9,11) verifies that it can switch communication from a first communication path comprising the target port to a secondary communication path comprising the other one of the first and second ports; determining whether each of the at least one host (7,9,11) can switch from the respective first path to the respective secondary path; upon acknowledgement by each of the at least one host that switching is possible, instructing each of the at least one host (7,9,11) to switch from the respective first path to the respective secondary path; and upon completion of each of the at least one host (7,9,11) switching to the respective secondary path, starting the software upload via the target port.

In one embodiment, if one of the at least one host is unable to verify its ability to failover, no approval is given for taking relevant resources out of active service. There is a deferral of the software upload or other planned service operation, which may involve generating an alert for the attention of service engineers.

In one embodiment, a negative acknowledgement is sent from the at least one host that is unable to switch to prevent a potentially disruptive service operation such as uploading of software onto a storage system.

In one embodiment, a request command is sent to each of the at least one host for requesting that each of the at least one host verifies that it can switch to a failover or secondary path, and a failover is performed automatically when each host verifies successfully.

In one embodiment, for each host, the operation of verifying the possibility of switching communication from a respective first communication path between at least one host computer and a data storage system to a respective secondary communication path includes sending Input/Output operation commands between each of the at least one host and the storage system along the respective secondary path.

In one embodiment, each of the at least one host being able to switch sends a respective acknowledgement command to acknowledge that it can switch from its respective first path to its respective secondary path.

In one embodiment, the target port is rendered non-active before starting the software upload.

In one embodiment, each of the at least one host has first and second host interfaces and wherein for each host, the respective first path includes the respective first host interface and the respective secondary path includes the respective second host interface.

In one embodiment, the first and the second host interfaces are Host Bus Adapter interfaces.

In one embodiment, a host computer is able to continue exchanging data with the storage system along its first path while the at least one host is instructed to verify that it can switch to its secondary path.

In one embodiment, when the at least one host is instructed to switch, it reroutes only the data travelling along its first path to its secondary path.

In one embodiment, software for uploading onto a data storage system is stored on a storage medium connectable directly to the target port of the storage system.

In one embodiment, the storage system includes a symmetric active-active storage system.

In another aspect of the disclosure, there is provided a computer program comprising program code instructions operable on a host, for controlling non-disruptive uploading of software onto a storage system, the storage system having first and second activable ports, and the storage system being communicatively coupled to the host via the first port and/or the second port, the computer program-readable code is configured to execute the operations of receiving a request command for verifying that the host can switch communication data from a first path comprising the target port to a secondary path comprising the other port, and sending I/O operations commands on the secondary path to verify that the host can switch from the first path to the secondary path, and if the host can switch, sending an acknowledgement command from the host to confirm that switching is possible, receiving a command instructing the host to switch from the first path to the secondary path, and thereafter switching the host.

In one embodiment, the program includes code instructions to send a negative acknowledgement command from the host if the host cannot switch.

In another aspect of the disclosure, there is provided a computer program comprising program code instructions operable on a memory device 28 for controlling non-disruptive uploading of software onto a storage system, the storage system having first and second activable ports, and the storage system being communicatively coupled to a host via the first port and/or the second port, the program code being configured for uploading the software on the storage system when one of the first or second port is selected as target port, the program code being configured to execute the operations of sending a request to the host for verifying that the host can switch communication data from a first path comprising the target port to a secondary path comprising the other port, verifying that the host can switch from the first path to the secondary path, and upon acknowledgement by the host that switching is possible, sending an instruction command for switching the host from the first path to the secondary path, and upon completion of the host switching, starting the software upload via the target port.

In one embodiment, the computer program includes code instructions for preventing uploading the software on the storage system when the memory device 28 receives a negative command from the host.

The computer program includes code instructions for implementing the method according to embodiments of the disclosure.

In another aspect of the disclosure, there is provided a system for controlling non-disruptive uploading of software, the system comprising a storage system 1 having first and second activable ports 3,5, at least one host, and the storage system 1 capable of being communicatively coupled to the at least one host via the first port and/or the second port, wherein: the first or the second port can be selected as a target port for use in uploading the software on the storage system, and wherein each of the at least one host can verify if it can switch communication data from a first path comprising the target port to a secondary path comprising the other port, and each of the at least one host can switch from the respective first path to the respective secondary path, and wherein each of the at least one host can acknowledge if it can switch, and wherein each of the at least one host can be instructed to switch from the respective first path to the respective secondary path, and wherein each of the at least one host can switch for the software upload to start via the target port.

In another aspect of the disclosure, there is provided a system for implementing the method of controlling uploading the software on the storage system 1 according to embodiments of the disclosure.

According to another aspect of the disclosure, there is provided a computer program product for controlling uploading a software, the computer program product comprising a computer-readable storage medium having computer-readable program code embodied therewith, the computer-readable program code configured to carry out the method of the disclosure.

According to an aspect of the disclosure, there is provided a method or system substantially as hereinbefore described with reference to the accompanying drawings.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in accordance with some embodiments.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

Example embodiments are described below in more detail, with reference to FIGS. 2, 3, 4, including various operations of a method for controlling a non-disruptive software upload.

It is assumed that the software to be uploaded on the storage system 1 is contained on a source 27 which can be on a memory device 28. In some embodiments, the memory device 28 is communicatively couplable to each of the hosts 7,9,11 associated with the storage system. FIG. 2b, for example, shows a communication link 29 between the memory device 28 and the host 7; but also shows the memory device 28 connected directly to a communication port ('port_0' 3) of the storage device. If the memory device 28 is connected to the host 7, the connecting link 29 to the host 7 may be via one of the HBAs of the host 7 or another communication interface. If the memory device 28 instead connects to a port 3 of the storage system, requests can be sent to the host 7 via the SAN fabric 2. The memory device 28 is usually operable by an administrator who accesses and manages the storage system. A memory device 28 can be connected to a storage system 1 or a host 7 by means of Point to Points links (PtoP) or broadcast links. The memory device 28 may also be connected to the storage system 1 or host 7 through the SAN fabric (not shown on any figure).

Figure 3:
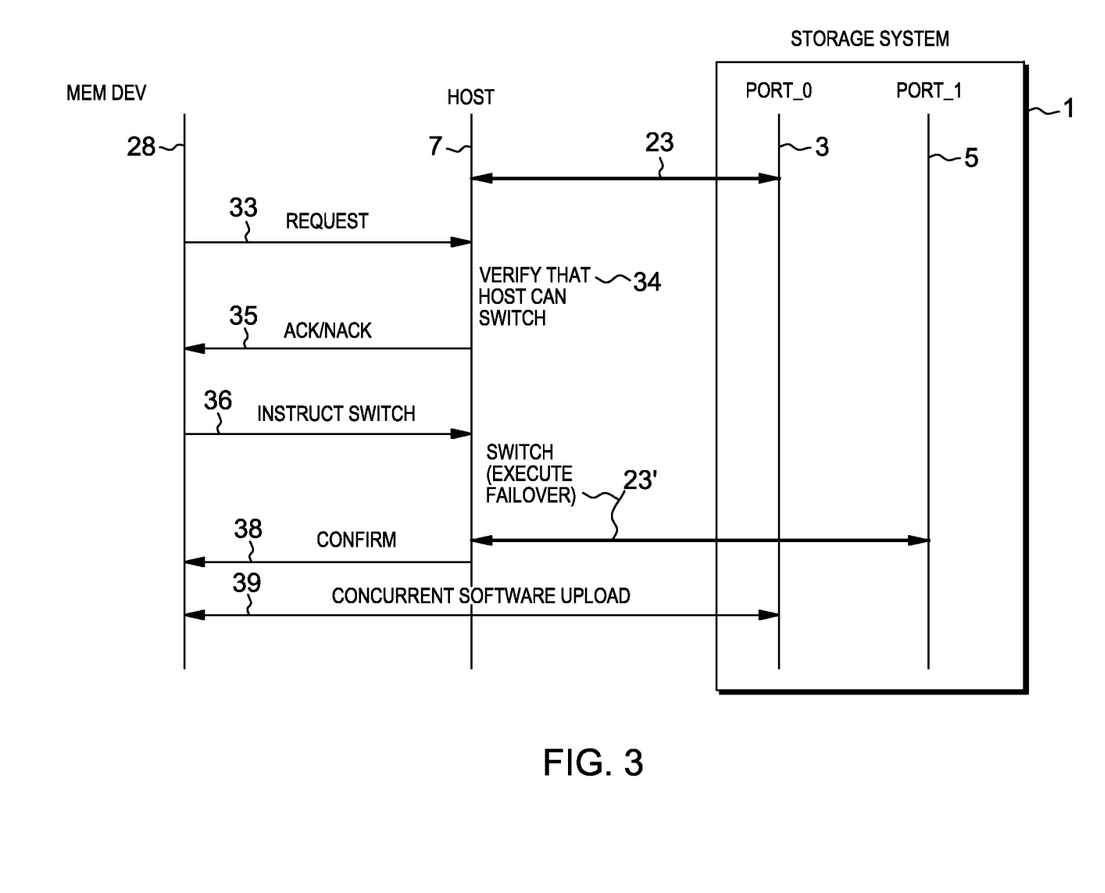
FIG. 3 is a functional block diagram illustrating a flow of messages, including control messages, in accordance with an embodiment of the present disclosure.

FIG. 3 displays a call flow relating to only one host 7. However, it is understood that, where there are a plurality of hosts associated with the storage system, the various operations involving the host 7 will take place separately for each host.

We first turn to FIGS. 2 and 3 for describing the operations occurring when only one host is attached to a component of the storage system 1 which is to be upgraded. In the following, we assume that the component of the first part of the storage system 1 to be upgraded via a software upload (not shown in the figure) is associated with a port 3, such as 'port_0'. This component can be, for example, a first SVC controlling a part of the storage system containing 'port_0' 3. It could also be a memory device such as a hard disk drive or a solid state drive, etc.

In FIG. 3, prior to operation 33, a host 7 is communicatively coupled to the storage system 1 via 'port_0' 3 and/or 'port_1' 5 of the storage system. FIGS. 2 and 3 show a data flow 23 between the host 7 and the storage system 1 via 'port_0' 3 along a primary active path. In operation 33 of FIG. 3, a "REQUEST command" is sent to the host 7 through the link 29 or through the SAN fabric 2. As mentioned above, the REQUEST command 33 could be sent from any device including from the memory device 28 where the software to be uploaded is stored. The REQUEST command is sent by a module 41 executing a computer program according to embodiments of this disclosure. The request 33 may indicate the port number on the storage system ('port_0' 3 according to the illustrated examples) through which the software will be uploaded. It can also indicate the number of the other port (e.g. 'port_1' 5). The REQUEST command may be sent to a unicast address uniquely identifying the host 7. In operation 34 of FIG. 3, upon processing the REQUEST command by a module 42, the host 7 verifies that it can switch communication data from the primary path to a secondary path. Operation 34 includes sending Input/Output commands by the host 7 along at least one alternative path that contains the other port 'port_1' 5. The host also attempts to switch to this secondary path. This attempt to switch may comprise forcing a multipath driver 22 to select another default interface (e.g., HBA2 instead of HBA1) for the outgoing communication data 23. If the host has assessed that a secondary path is working and that it can switch or failover from its active path to a secondary path, it sends Acknowledgement (ACK 35) to the memory device 28. Thereafter, in operation 36 of FIG. 3, the memory device 28, by means of the module 41, sends a command instructing the host to switch or to failover. In operation 23', the failover takes place and the data communication path between the host and the storage system 1 is switched. FIGS. 3 and 4, for example, show a switched data flow 23' between the host 7 and the 'port_1' 5 of the storage system 1. Finally in operation 38, upon successful failover, the host, by means of the module 42, sends a "CONFIRM" message to the memory device 28. The module 41 can now interpret the CONFIRM message as a trigger for initiating the software upload in operation 39. The CONFIRM message is optional because the start of the software upload may simply be triggered by sending an INSTRUCT in operation 36. As the host 7 had already verified in operation 34 that it is capable of failing over, the ACK can serve as a confirmation that the failover will be successful. If the CONFIRM is not used, the software upload may be started after a predetermined period of time following the reception of an ACK message 35.

If in operation 34, the host is not capable to verify that it can switch to a secondary path or fails to switch, then a negative Acknowledgement NACK 35 is sent to the memory device 28. Reception of the negative acknowledgement NACK 35 will serve to prevent the start of the software upload.

Each of the messages: REQUEST 33, ACK or NACK 35, INSTRUCT 36, CONFIRM 38 is processed, sent and received by the modules installed on the memory device 28 and the host 7. These messages can be implemented by proprietary or standard commands (e.g., iSCSI). Each of these messages between the host 7 and the memory device 28 can be sent through the link 29 or through the SAN fabric 2.

Figure 4:
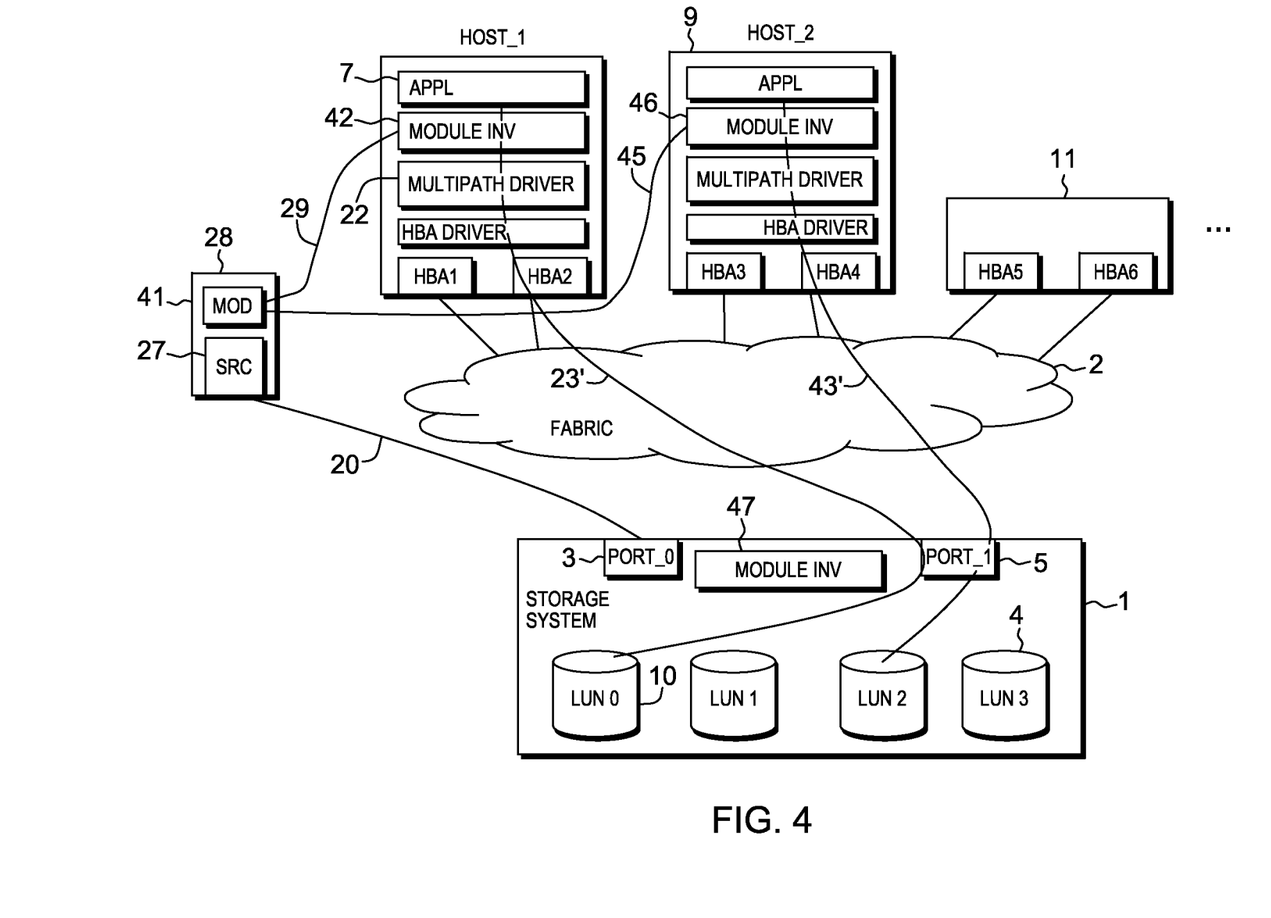
FIG. 4 is a functional block diagram illustrating a plurality of hosts and storage systems that include components, in accordance with an embodiment of the present disclosure.

Now referring more particularly to FIGS. 1, 3, 4, 5, 6 we describe the operations according to further embodiments. In these embodiments, several hosts 7, 9, 11 as shown in FIG. 1 are communicatively coupled to the storage system 1. It is assumed that each host can communicate with the storage system 1 via a first path and via a secondary path. Referring to FIG. 4 for example, a first communication path between the host_1 7 and the storage system 1 would include HBA1, and 'port_0' 3. A secondary path between host_1 7 and the storage system 1 would include HBA2 and 'port_1' 5. Primary and secondary paths between the host_2 9 and the storage system 1 may include the pairs (HBA3, 'port_0' 3) and (HBA4, 'port_1' 5) respectively.

Figure 5:
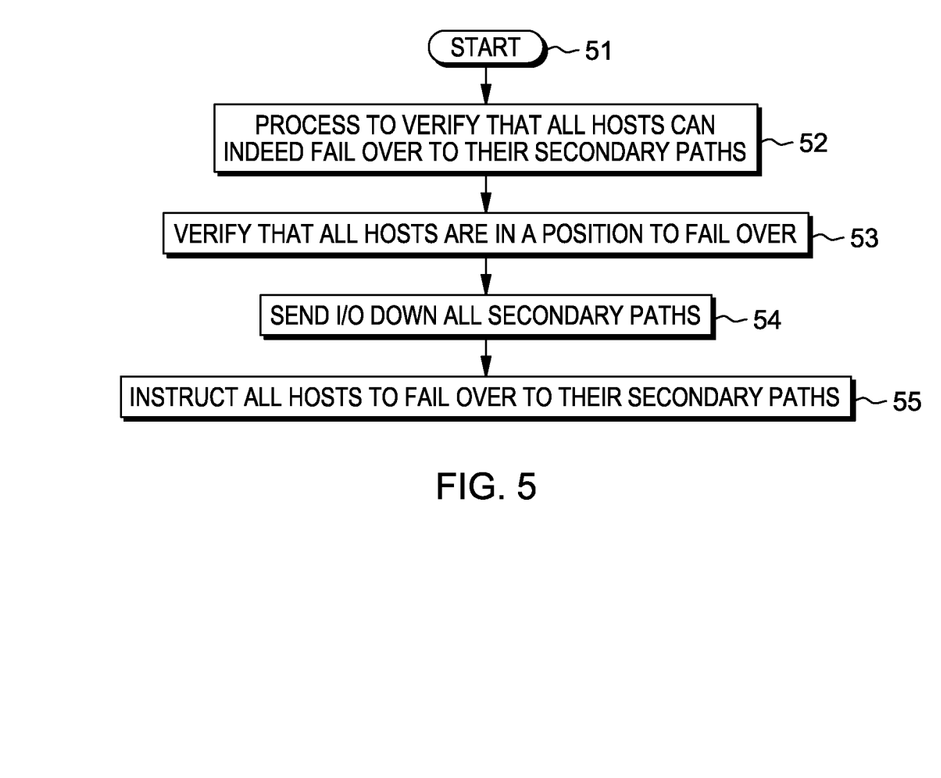
FIGS. 5 and 6 illustrate flow charts, in accordance with embodiments of the present disclosure.
Figure 6:
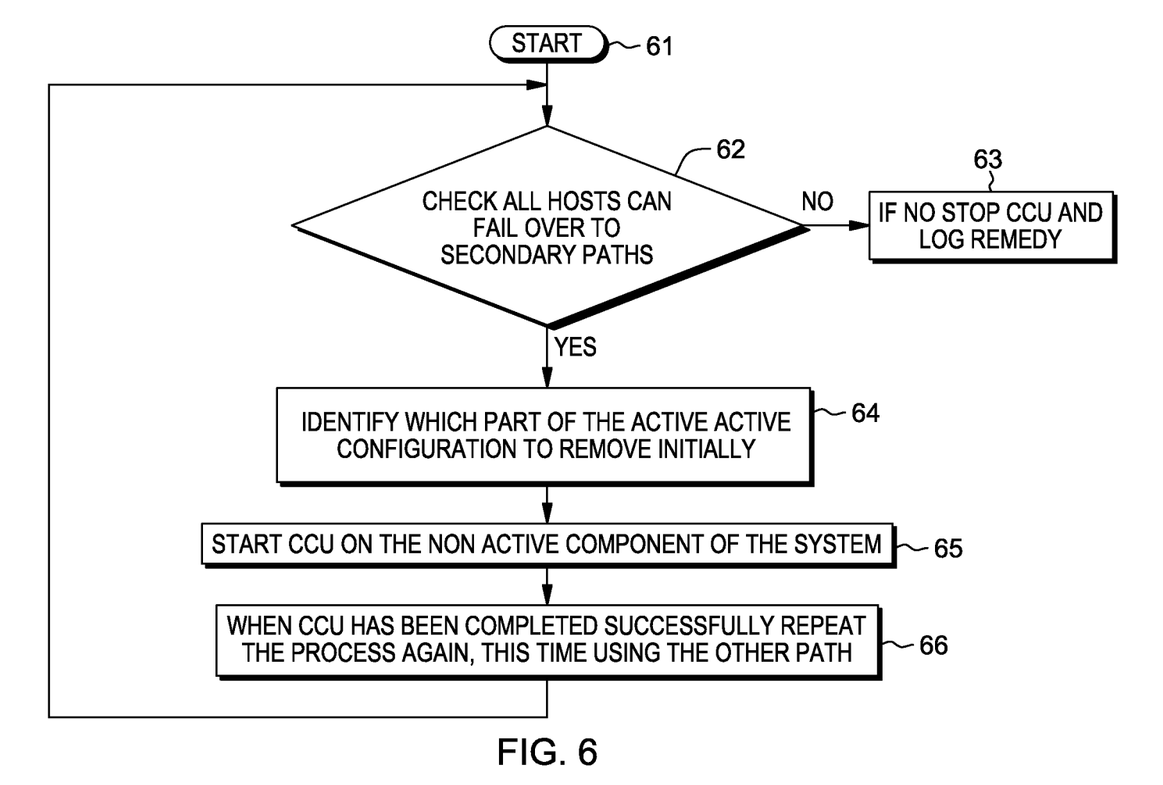

We now refer to FIGS. 4, 5 and 6 to describe these embodiments.

In operation 51 of FIG. 5 or operation 61 of FIG. 6, a software stored in the source 27 is to be uploaded on the storage system 1 for the purpose of upgrading the storage system 1 for example.

In check operation 62 (FIG. 6) or operations 52-54 of FIG. 5, a process checks that each one of the plurality of hosts 7,9,11 can switch or failover to its respective secondary path. This operation is achieved by a process that involves sending Input/Output operations down all the hosts' secondary paths (operation 54 of FIG. 5). In such a process, each host 7,9 can send via its respective module 42, 46 certain commands to a module 47 on the storage system 1 and expects for each command a response. Referring to FIG. 3, each host verifies its ability to switch in operation 34. If, through this process, each of the hosts 7, 9, 11 successfully verifies that it can failover to its respective secondary path, then operation 64 is entered.

If at least one host is not able to fail over to its secondary path, the result of the verification of operation 62 is negative, the Concurrent Code Upload (CCU) is stopped and a log remedy is recorded in operation 63. The failure of a host to failover may be caused as mentioned above by a software problem such as for example a failure of an HBA client to fail over. It could of course be caused by a hardware or a network connection problem. Such an event prevents the start of the software upload according to some embodiments. When the module 41 receives a NACK 35 from one host, it prevents starting the software upload even if other hosts have sent ACKs indicating their ability to failover.

In operation 64, the part of the Active Active configuration to be removed is identified. In operation 64, there needs to be a selection of the part of the storage system that will be turned off or made non-active to receive the software upgrade code. In a typical Active Active system, there is a pair of ports 3,5 which can be simultaneously active to exchange communication data with various hosts 7,9, 11 coupled thereto. Whenever software needs to be uploaded, the method according to some embodiments enables the port ('port_0' 3 or 'port_1' 5) to be selected as target port. The target port may become non-active so as not to be part of an operational data path. This selection can be done manually by the network administrator. Alternatively, such selection can be performed by executing a program running on a module 41 installed on the memory device 28. This selection can be made for example by probing each of the ports of the storage system 1 to evaluate if a port is not fully utilized and thereafter selecting the most under-utilized port. However in a symmetric Active-Active system, each port of the system is expected to be equally utilized as each port 3,5 is made to handle exactly 50% of the overall traffic load. In this case, the selection of the target port can be arbitrary according to the choice of the component to be first upgraded. Referring to FIG. 4, the target 'port_0' 3 identifies the part of the configuration through which the software upload will first proceed. The target 'port_0' 3 being the target port associated with the component to be made non-active, all hosts 7,9,11 attempt to failover to alternative paths containing the other port 'port_1' 5. Each of the host sends an Acknowledgement ACK 35 message to the module 41 to indicate their ability to failover.

In operation 65, when the module 41 has received all the ACKs from all the hosts 7,9,11, it finally sends an instruction to failover to all the hosts (operation 55 of FIG. 5). For this purpose, an individual INSTRUCT 36 message may be sent to each host unicast address in response to the respective triggering ACK 35. Alternatively, a single INSTRUCT message may be sent to the broadcast address or to an all-hosts multicast address. Thereafter, each of the hosts switches as shown in operation 23' of FIG. 3. FIG. 4 exemplary shows the data streams 23' and 43' of the hosts Host_1 7 and Host_2 9 along their respective secondary path through the other port 'port_1' 5 after the failover. The component to be upgraded is no longer being used by any host. Finally, once it is confirmed that all the hosts have completed their failover (e.g., operation 38), the non-active component can be upgraded by software upload. The module 41 may wait to receive a CONFIRM message 38 from each of the hosts before starting the software upload on the non-active component via the target port 5 (operation 65 or operation 39). Thereafter, the software upload (the CCU) is performed via the target port, whilst user data traffic between the hosts and the storage system remains uninterrupted via the other active port (e.g., 'port_1' in FIG. 3). During a software upload, the target port through which the software is uploaded is for example 'port_0' 3 on the figures. It is noted that prior to the start of the software upload the part of the system to be upgraded needs to be non-active so that the software does not conflict with any user data. Such a software upload which uses the failover capability is regarded as non-disruptive and concurrent because it prevents application disruption during software installation. Examples of such concurrent software upload include uploading licensed machine code, updating a firmware current release, upgrading to a new release, which usually occur simultaneously with user data traffic. Rendering a part of a system non-active can be done by removing the target component from the Active configuration. This can be done manually or by executing a computer program. So, referring to the figures, the data traffic which was using the target port 3 would then failover using a secondary failover path that includes the remaining Active port 5. The Concurrent code is then uploaded through a direct link 20 for example.

It is noted that the present disclosure does not exclude uploading a software via a target port which would remain active during upload.

In operation 66, when another component of the system 1 needs upgrade, the same process will be repeated by first checking if all hosts can failover to their secondary paths (now the old primary paths). This operation facilitates upgrading separately each component of a pair of components. This method can be used where in a typical system containing a pair of controllers for example, it is needed to upgrade one controller first and then the other separately.

In operation 66, when the software upload (CCU) has been completed on the storage system 1 via the target port, the process of FIG. 6 can be repeated using the other port. After the completion of the upload through the target port (e.g., 'port_0'3), this port would be rendered Active again for the purpose of rebalancing the data traffic. Redundant paths are again made available from each host to the storage system 1, by virtue of having two ports active simultaneously on the storage system 1. Two available paths from any host leading to the two ports (e.g., ports 3, 5) may be simultaneously active. Thereafter, provided that all the hosts can failover to their secondary paths (operation 62 and 64), the previously active port along the previous failover paths is identified as target host (e.g., 'port_1' 5) to be rendered non-active. After causing all the hosts to switch to their new failover paths, and rendering the new target port non-active, the software upload can then start via the new target port (e.g., 'port_1' 5).

This process can be used to upgrade an entire system (e.g., symmetric active active system) by successively upgrading a part first and then another part of the system without disturbing any user traffic. A part of a system that can be so upgraded can be any hardware or software component.

In the method illustrated by FIG. 6, the order in which the operations occur can vary. For example the identification of the target port associated with the component to become non-active (operation 64) may take place prior to the operation of requesting that all hosts attached to that port are in a position to failover (check operation 62).

In other embodiments, a host may have only one network interface instead of two network interfaces. In this case, path failover does not result in a switch of interface. For example, if only one HBA is present on the host, the multipath driver controls the path failover so as to retain the same HBA in the secondary path.

In other embodiments, the system to be upgraded includes at least one storage device. The method according to these embodiments controls the software upload on any device by verifying that all the hosts can failover from one storage device to another storage device. Upon such verification, all hosts configured to communicate with the storage device to be upgraded are instructed to failover to a different storage device.

In some embodiments, only the hosts which are attached to the component identified to be upgraded will failover.

In some embodiments, only the traffic that is directed to the port connected to the component to be upgraded will be rerouted during the failover.

Although few embodiments have been illustrated, the person skilled in the art will understand that the described embodiments do not limit the scope of the present disclosure.

Figure 7:
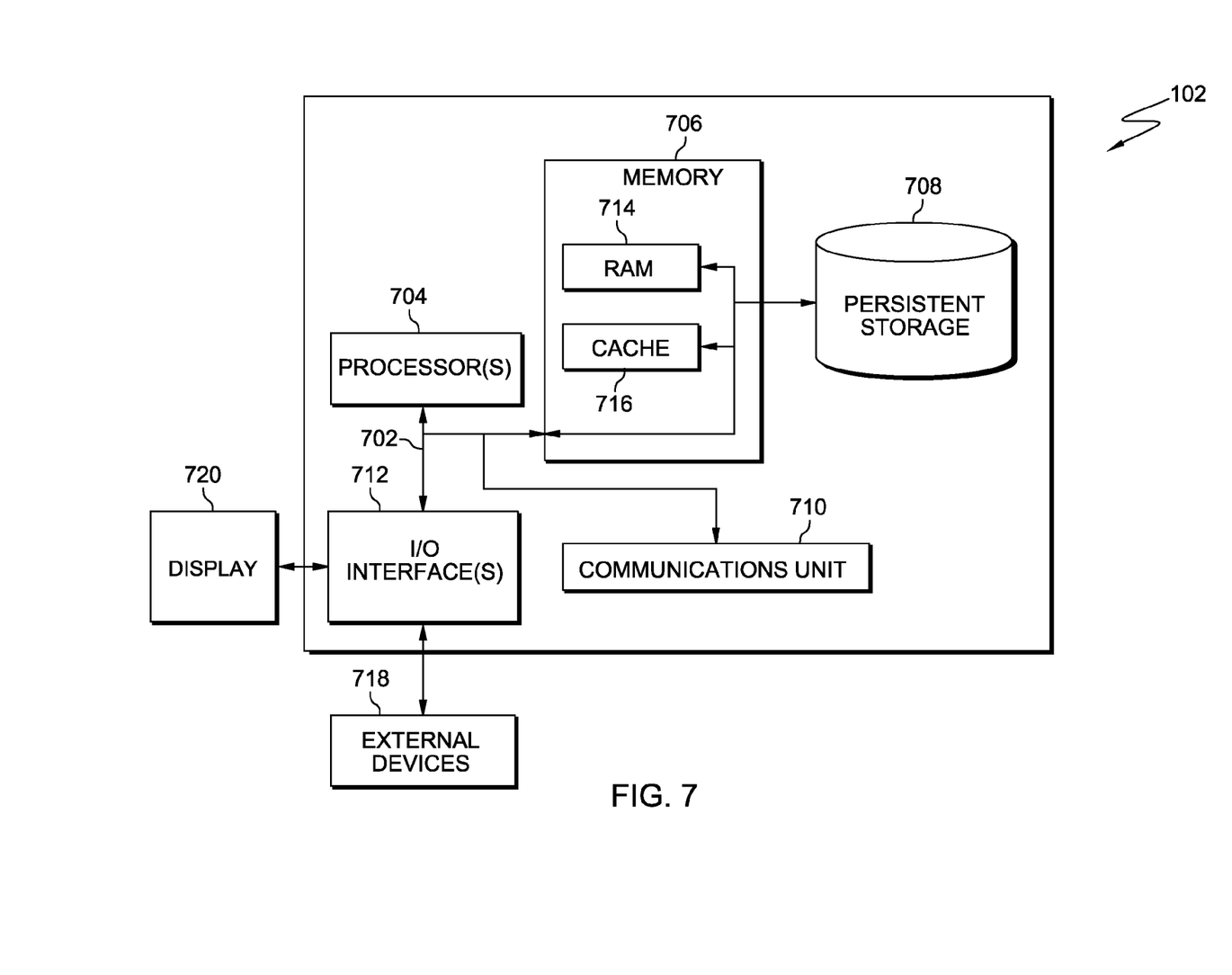
FIG. 7 depicts a block diagram of components of a computing device, in accordance with an embodiment of the present disclosure.

FIG. 7 depicts a block diagram, 700, of components of computing device 102, which may represent, for example, storage system 1 or host 7, 9, or 11, in accordance with an illustrative embodiment of the present disclosure. It should be appreciated that FIG. 7 provides only an illustration of one implementation and does not imply any limitations with regard to the environments in which different embodiments may be implemented. Many modifications to the depicted environment may be made.

Computing device 102 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

One or more programs including the functionality described above (see FIGS. 1-6 and accompanying discussions) are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of fabric 2. In these examples, communications unit 710 includes one or more network interface cards. Communications unit 710 may provide communications through the use of either or both physical and wireless communications links. The one or more programs including the functionality described above (see FIGS. 1-6 and accompanying discussions) may be downloaded to persistent storage 708 through communications unit 710.

I/O interface(s) 712 allows for input and output of data with other devices that may be connected to computing device 102. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present disclosure, e.g., one or more programs including the functionality described above (see FIGS. 1-6 and accompanying discussions), can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

What is claimed is:

1. A method comprising:
in response to a requirement for failover from a first resource to a second resource, testing, by one or more processors, an availability of the second resource, wherein the first and second resources are redundant resources of a network-connected data processing apparatus that is communicatively coupled to at least one host computer;
in response to a positive determination of the availability of the second resource, initiating, by one or more processors, the failover; and
in response to a negative determination of the availability of the second resource, providing, by one or more processors, an indication of unavailability, wherein the network-connected data processing apparatus is communicatively coupled to at least one host computer,
wherein a first failover is performed from the second resource to the first resource in response to a requirement to take the second resource out of operational service, the method further comprising:
in response to a requirement for a second failover from a first resource to a second resource, testing the availability of the second resource;
in response to a positive determination of the availability of the second resource, initiating the second failover; and
in response to a negative determination of the availability of the second resource, providing an indication of unavailability of the second resource.

2. The method of claim 1, wherein testing availability of the second resource comprises verifying, by one or more processors, the ability of the at least one host computer to failover to the second resource.

3. The method of claim 1, wherein the requirement for failover from the first resource is determined automatically in response to a request to take one of more resources out of operational service to carry out one or more resource updates.

4. The method of claim 3, wherein the one or more resource updates include updates to be performed as a sequence to update a plurality of resources, wherein an update of the first resource follows a verification of the ability to failover from the first resource to the second resource, and wherein an update of the second resource follows a verification of the ability to failover from the second resource to the first resource.

5. The method of claim 1, wherein testing the availability of the second resource comprises an update controller component requesting that the at least one host computer sends input/output commands via the second resource, and wherein the at least one host computer replies to the update controller component.

6. The method of claim 1, wherein the first and second resources are data storage systems or components of a data storage system.

7. The method of claim 6, wherein the components of a data storage system comprise storage system controllers or communication ports of a storage system.

8. A computer program product comprising a computer readable storage medium having program instructions embodied therewith, the program instructions executable by a processor to cause the processor to perform a method comprising:
in response to a requirement for failover from a first resource to a second resource, testing, by one or more processors, an availability of the second resource, wherein the first and second resources are redundant resources of a network-connected data processing apparatus that is communicatively coupled to at least one host computer;
in response to a positive determination of the availability of the second resource, initiating the failover; and
in response to a negative determination of the availability of the second resource, providing an indication of unavailability,
wherein testing the availability of the second resource comprises an update controller component requesting that the at least one host computer sends input/output commands via the second resource, and wherein the at least one host computer replies to the update controller component.

9. The computer program product of claim 8, wherein testing availability of the second resource comprises verifying the ability of the at least one host computer to failover to the second resource.

10. The computer program product of claim 8, wherein the requirement for failover from the first resource is determined automatically in response to a request to take one of more resources out of operational service to carry out one or more resource updates.

11. The computer program product of claim 10, wherein the one or more resource updates include updates to be performed as a sequence to update a plurality of resources, wherein an update of the first resource follows a verification of the ability to failover from the first resource to the second resource, and wherein an update of the second resource follows a verification of the ability to failover from the second resource to the first resource.

12. The computer program product of claim 8, wherein the first and second resources are data storage systems or components of a data storage system.

13. A computer system comprising:
a memory; and
a processor in communication with the memory, wherein the computer system is configured to perform a method, the method comprising:
in response to a requirement for failover from a first resource to a second resource, testing, by one or more processors, an availability of the second resource, wherein the first and second resources are redundant resources of a network-connected data processing apparatus that is communicatively coupled to at least one host computer;
in response to a positive determination of the availability of the second resource, initiating the failover; and
in response to a negative determination of the availability of the second resource, providing an indication of unavailability, wherein the requirement for failover from the first resource is determined automatically in response to a request to take one of more resources out of operational service to carry out one or more resource updates.

14. The computer system of claim 13, wherein testing availability of the second resource comprises verifying the ability of the at least one host computer to failover to the second resource.

15. The computer system of claim 14, wherein the one or more resource updates include updates to be performed as a sequence to update a plurality of resources, wherein an update of the first resource follows a verification of the ability to failover from the first resource to the second resource, and wherein an update of the second resource follows a verification of the ability to failover from the second resource to the first resource.

16. The computer system of claim 13, wherein testing the availability of the second resource comprises an update controller component requesting that the at least one host computer sends input/output commands via the second resource, and wherein the at least one host computer replies to the update controller component.

17. The computer system of claim 13, wherein the first and second resources are data storage systems or components of a data storage system.

* * * * *